July 14, 1953 G. H. BOYD 2,645,286
TAPE DISPENSING DEVICE
Filed Aug. 2, 1946 5 Sheets-Sheet 1
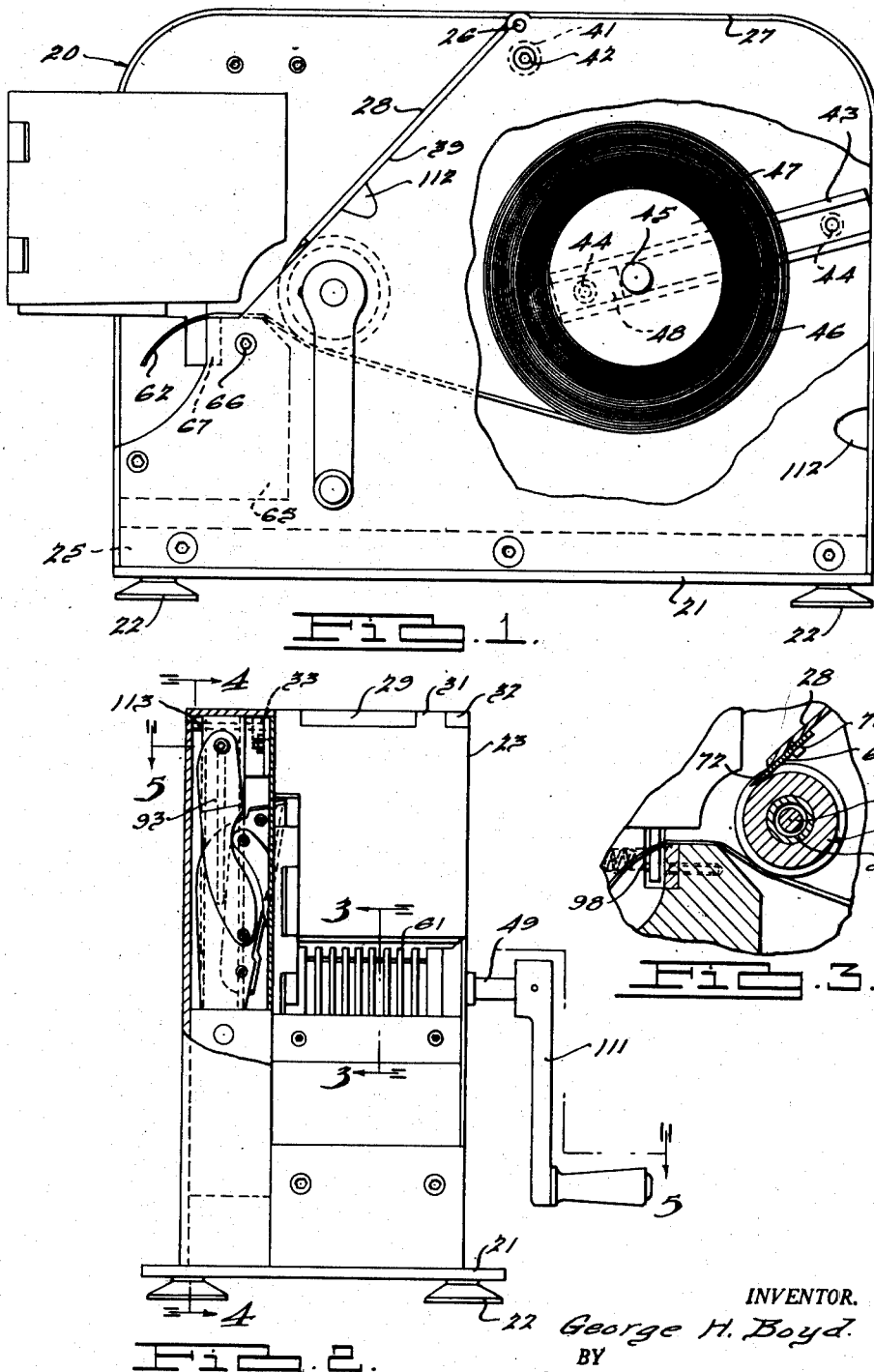

July 14, 1953 G. H. BOYD 2,645,286
TAPE DISPENSING DEVICE
Filed Aug. 2, 1946 5 Sheets-Sheet 2

INVENTOR.
George H. Boyd.
BY
Harness, Dickey & Pierce
ATTORNEYS

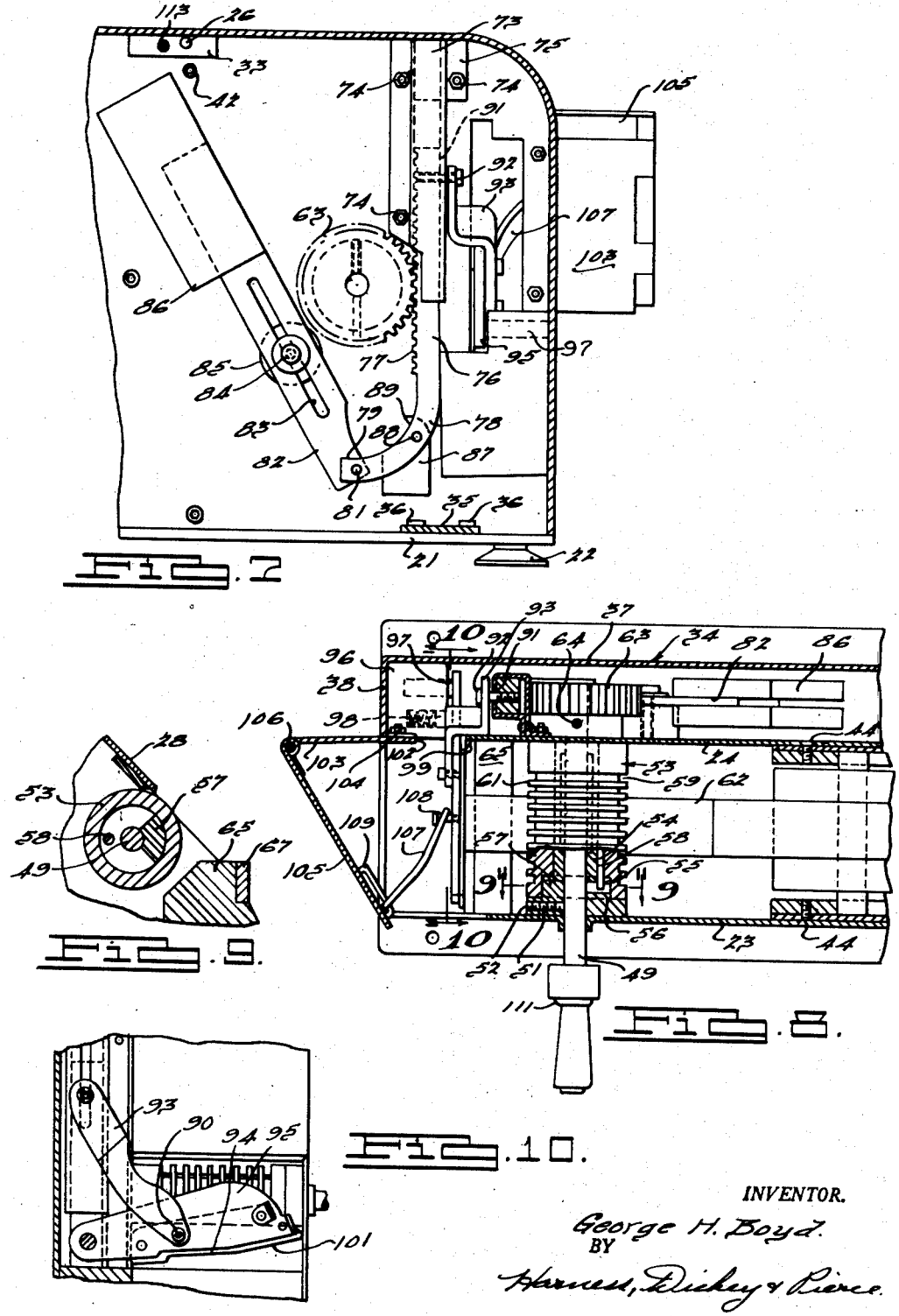

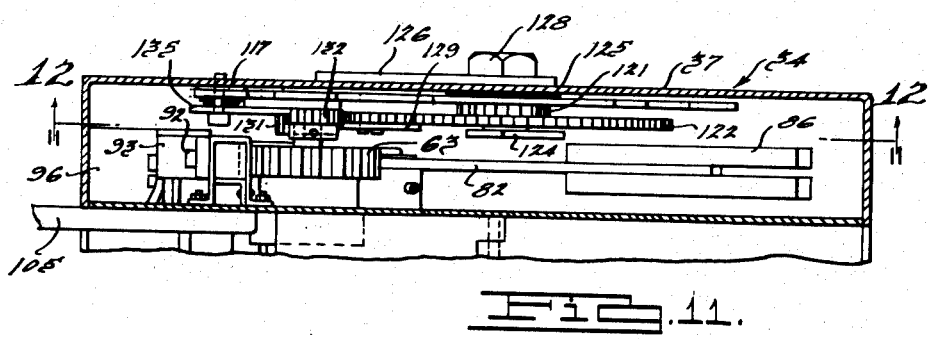
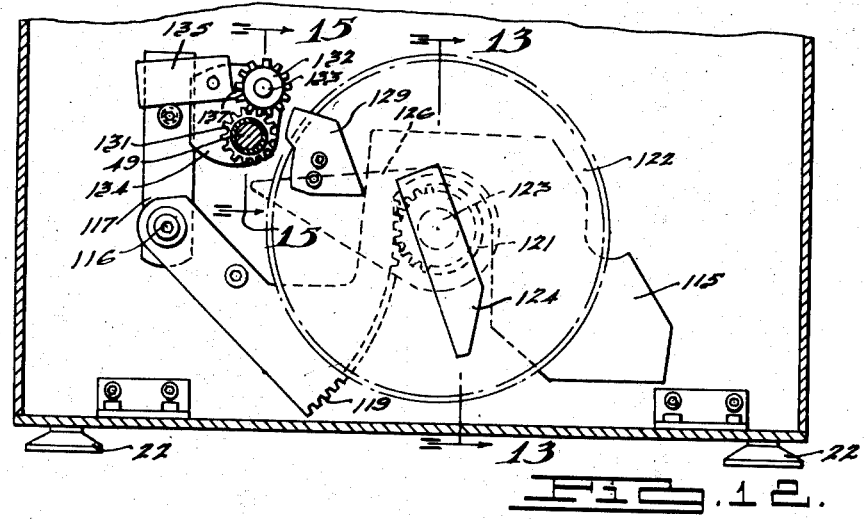
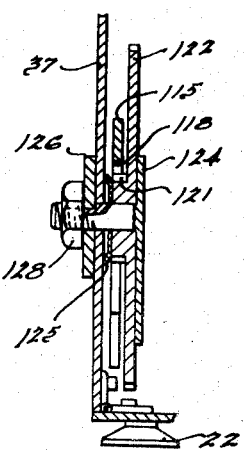

July 14, 1953  G. H. BOYD  2,645,286
TAPE DISPENSING DEVICE
Filed Aug. 2, 1946  5 Sheets-Sheet 5

INVENTOR.
George H. Boyd.
BY
Harness, Dickey & Pierce.
ATTORNEYS.

Patented July 14, 1953

2,645,286

UNITED STATES PATENT OFFICE 2,645,286

TAPE DISPENSING DEVICE

George H. Boyd, Royal Oak, Mich.

Application August 2, 1946, Serial No. 688,110

7 Claims. (Cl. 164—42)

This invention relates to a tape dispensing and severing device, and particularly to a device for metering and severing sticky tape.

Difficulty has been experienced in the past in handling sticky tape due to the difficulty of pulling the tape from the roll and in severing lengths therefrom. Usually the end of the tape is pulled directly by the operator from the roll and severed on a row of teeth to which the roll end of the tape adheres so that the end may again be grasped and a piece pulled from the roll prior to severing. The row of teeth may be fixed to the base portion of the elements which supports the rolls, or it may be mounted to swing between predetermined points so that a measured length of the tape may be dispensed at each operation.

In practicing the present invention, the tape dispensing device is provided with a roll of cylindrical form having the contacting cylindrical face slotted to provide spaced lands which engage the tape. Suitable means are provided for driving the roll in rotation in a forward direction to pull a length of the tape from the roll of tape. Means are provided in the slots between the lands for removing the tape from the lands to prevent the tape from winding thereon. Forwardly of the roll a fixed blade is mounted over which the tape is drawn by the operator until a desired length is reached, after which a reverse movement of the handle actuates a pivoted cutting blade which moves over the first blade and severs the length from the roll of tape. Upon revolving the handle in the forward direction, a further length of tape is drawn from the roll of tape by the operating roll and after a predetermined length is advanced in this manner a reverse movement of the handle again produces the severing of the length therefrom. A suitable guard is provided in the nature of a hinged gate which covers the blades during the severing operation as a safety feature to protect the operator from being cut by the blade operation. A positive stop mechanism may be provided for measuring the length of tape delivered each operation which is adjustable so that the device may be set for metering different lengths of tape therefrom.

Accordingly, the main objects of the invention are: to provide a device which unwinds the sticky tape from a roll and advances it across a pair of cutting blades which are relatively actuated by the reverse movement of the operating means to sever the length from the roll; to provide a device for pivotally supporting a roll of sticky tape and a cylinder operated by a handle for drawing the tape from the roll and advancing it through cutting means which severs the tape upon the reverse movement of the handle; to provide a device for drawing tape from a roll, with stop means which limits the advance operation of the pulling means so that like lengths of tape may be drawn from the roll of tape and severed; to provide a cylinder for drawing tape from a roll of tape having spaced surfaces which engage the tape between which fingers extend for removing the tape from the cylinder and preventing it from being wound thereon in case it is not drawn therefrom by the operator; and, in general, to provide a tape dispensing device which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken view in side elevation of a tape dispensing device embodying features of this invention;

Fig. 2 is a broken end view of the structure illustrated in Fig. 1, as viewed from the left-hand end of the figure;

Fig. 3 is a sectional view of the structure illustrated in Fig. 2, taken on the line 3—3 thereof;

Fig. 7 is a broken view of the structure in Fig. 4, with the cutting blade in tape severing position;

Fig. 8 is a broken view of the structure illustrated in Fig. 5 with the cutting blade in tape severing position;

Fig. 9 is a sectional view of the structure illustrated in Fig. 8, taken on the line 9—9 thereof;

Fig. 10 is a broken sectional view of the structure illustrated in Fig. 8, taken on the line 10—10 thereof;

Fig. 11 is a sectional view of an adjustable stop mechanism for measuring the tape which is dispensed by the device illustrated in Fig. 1;

Fig. 12 is a sectional view of the structure illustrated in Fig. 11, taken on the line 12—12 thereof;

Fig. 13 is a sectional view of the structure illustrated in Fig. 12, taken on the line 13—13 thereof;

Figure 4:
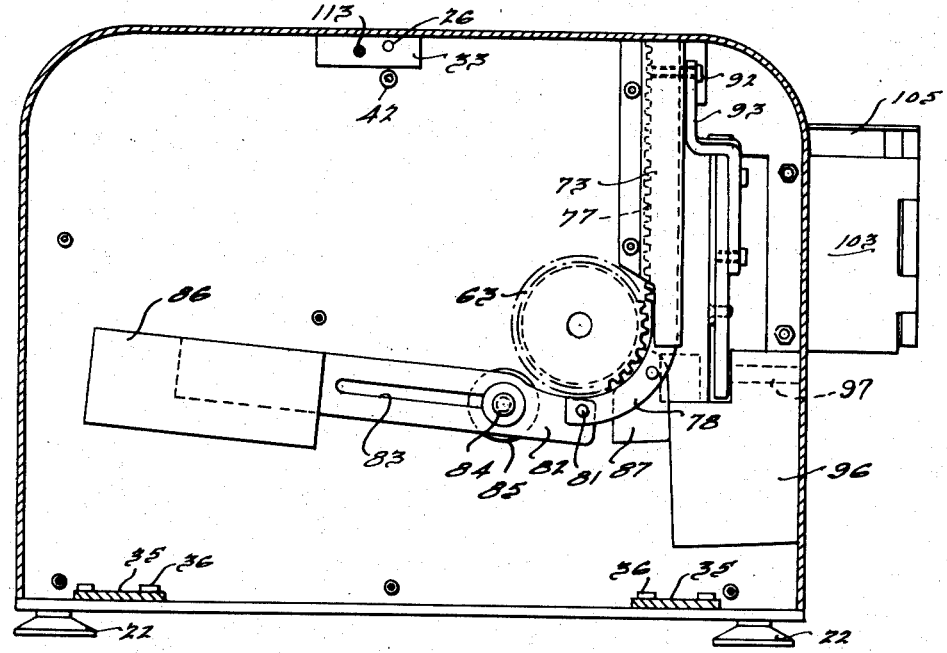
Fig. 4 is a sectional view of the structure illustrated in Fig. 2, taken on the line 4—4 thereof, with the cutting blade out of cutting position.
Figure 5:
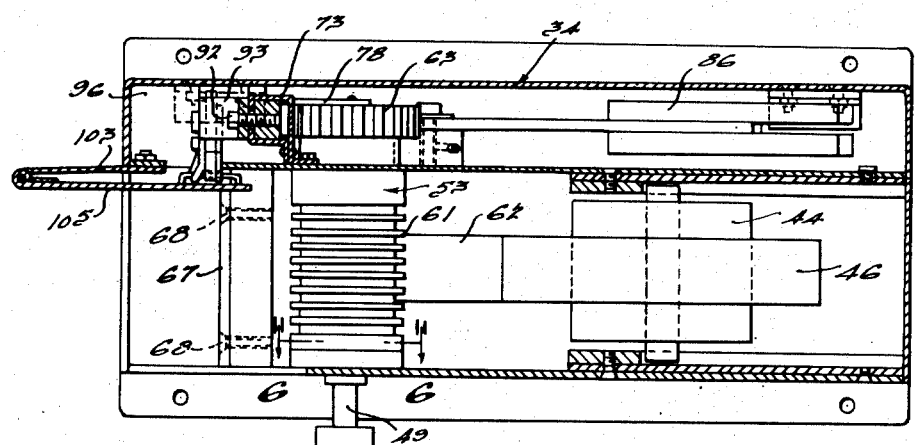
Fig. 5 is a sectional view of the structure illustrated in Fig. 2, taken on the line 5—5 thereof, with the cutting blade out of cutting position.
Figure 6:
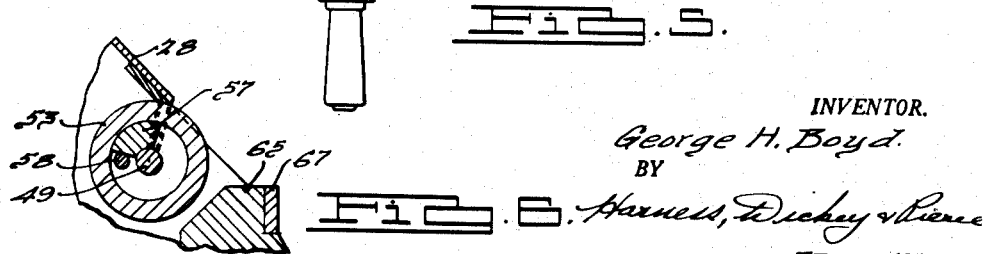
Fig. 6 is a sectional view of the structure illustrated in Fig. 5, taken on the line 6—6 thereof.

Referring more particularly to Figs. 1 to 10, the tape dispensing and severing device comprises a case 20 having a base 21 on which suction cup feet 22 or the like may be provided. The case comprises a pair of spaced front and rear walls 23 and 24, respectively, which are secured to a plate 25 by a plurality of screws. The plate 25 is secured to the base 21 and spaces the walls 23 and 24 a predetermined distance from each other. The top of the walls 23 and 24 supports a pintle 26 on which a rear cover element 27 and a front cover element 28 are pivoted by hinged portions 29 and 31 provided thereon, respectively. The front wall 23 has a hub portion 32 and the rear wall on the outside thereof is provided with a block 33, the pintle being journaled in the hub 32 and the block.

A rear cover 34 is mounted on hinges 35 which are secured to the base 21 by screws 36. The cover has a rear wall 37 of the shape of the wall 24 and has flanges 38 extending inwardly from the wall in a position to project over the wall 24. The front wall 23 slopes downwardly from the hub 32 providing the sloping edge 39 against which the hinged cover 28 rests. The walls 23 and 24 are interconnected at the top by a spacing element 41 secured by screws 42 extending into the ends of the bar from each of the walls 23 and 24. A pair of inwardly presenting channel elements 43 is secured in aligned sloping relation on the walls 23 and 24 by screws 44 for supporting a pin 45 on which a roll of tape 46 to be dispensed is mounted. Disks 47 of different diameters may be mounted on the pin 45 to be selectively employed to fit the different internal diameters of rolls of tape. The tape is mounted in the case by raising the cover 27 and placing the ends of the pin 45 in the channel elements 43 and pushing the tape and pin forwardly until the pin abuts blocks 48 at the end of each of the channel elements.

Forwardly of the channel elements 43, a shaft 49 is journaled in the walls 23 and 24, having an operating plate 51 secured thereto by a setscrew 52. A cylindrical roller 53, having a bearing 54 pressed therein, is mounted on the shaft to revolve freely thereon. One end of the roller 53 is provided with a recess 55 in which a shoulder 56 on the operating plate 51 projects. A finger 57, in the nature of a quadrant, extends inwardly from the shoulder 56 into the recess 55. A pin 58 on the roller 53 projects within the recess 55 in position to be engaged by the finger 57 when the shaft is operated in a clockwise direction. When the finger engages the pin, the roller 53 is driven with the shaft also in a clockwise direction.

The cylinder 53 is provided with a plurality of slots 59 to form a series of spaced lands 61 for engaging the strip of tape 62 along spaced lines as it is drawn from the roll of tape 46. The end of the shaft 49 extending beyond the wall 24, has a shoulder gear 63 secured thereto by a tapered pin 64. Forwardly of the cylindrical roller 53, a spacing bar 65 is secured between the walls 23 and 24 by screws 66 projected through each of the walls into the ends thereof. The spacing bar 65 carries a cutting bar 67 which is secured thereto by a pair of screws 68.

The cover 28 has a take-off plate 69 secured thereto by screws 71 containing tapered fingers 72 of a width to project within the slots 59 so as to have the finger disposed below the top circumferential edges of the lands 61. The sticky side of the tape 62 is engaged by the tops of the lands 61 when the cylinder 53 is rotated in a clockwise direction for drawing the tape from the roll of tape 46. The fingers 72 on the plate 69 prevent the tape from being carried by the roll and wound thereon when the end has not been grasped by the operator and guided outwardly as the roller 53 draws the tape from the roll of tape 46.

A tubular element 73 of rectangular shape is secured to the outer face of the wall 24 by bolts 74, the tube being opened at the top to provide an outwardly projecting flange 75 which is attached to the wall 24 by a bolt 74. The tubular element 73 forms a guide for a rack 76 having teeth 77 thereon which mesh with the teeth on the gear 63. An arcuately shaped arm 78 extends from the bottom of the rack 76 to provide an end 79 disposed substantially 90° to the rack portion 76. The end 79 is secured by a pivot 81 to a link 82, having a slot 83 therein through which a headed pin 84 projects. The pin is secured on a boss 85 on the wall 24 and aligns the link 82 with the end 79 on the rack 76. A weight 86 is secured to the end of the link 82 opposite to that to which the end 79 is pivoted. A pawl 87 is freely pivoted on the rack 76 by a pin 88 to have the projecting tooth portion 89 thereof disposed in position to engage the teeth of the gear 63. The preponderance of weight on the pawl 87 is below the pivot 88 to retain the projecting tooth in gear engaging position.

A slot 91 is provided through the wall of the tubular element 73 through which a screw 92 is threaded in the rack 76 to operate therewith. The screw pivotally supports one end of an offset link 93, the opposite end of which is pivoted to a cutting blade 94 by a screw or pintle 90. The cutting blade 94 is mounted on a supporting plate 95 pivoted to a block 96 by a pin 97 which is rigidly secured to the plate 95. A block 96 is supported on the side of the spacing plate 65 to be rigidly held in position relative to the cutting bar 67. The block 96 carries a spring pressed plunger 98 which provides an outward force toward the blade supporting plate 95 to urge the blade 94 into contact with the cutting bar 67. The cutting bar at the end adjacent to the wall 24 is relieved at 99 to permit the engagement of the cutting blade and bar without interference when urged into intimate relation by the plunger 98. The blade 94 may have the outer portion 101 disposed at a different angle to the inner portion so that the blade will progressively cut at a substantial angle to the cutting bar 67 in all positions when passed thereacross.

The wall 24 is slotted at 102 to permit the blade supporting plate 95 and link 93 to operate therethrough. A hinged plate 103 is secured to the forward end of the wall 24 by bolts 104 having a safety guard in the nature of a plate 105 pivoted thereto on a pintle 106. The outer end of the blade supporting plate 95 loosely supports the end of the guard operating link 107 on a pin 108. The opposite end of the link 107 is secured over a U-shaped rod 109 the ends of which are welded or otherwise secured to the plate or guard 105. When the blade is in cutting position, the link 107 advances the plate or guard 105 therewith to prevent the fingers of the operator from being contacted by the blade when severing the tape. When the blade is retracted to the position illustrated in Fig. 2, the plate or guard 105 is disposed against the inner surface of the wall 24 to cover the blade 101 and to clear the cutting bar 67 so that an additional length of tape may be advanced thereover. A crank 111 is secured to the end of the shaft 49 outwardly beyond the wall 23.

The operation of the device is as follows. A roll of tape 46 is placed upon the roller 47 and shaft 45 and mounted within the channel elements 43. The end of the tape is advanced to have the sticky side thereof engaged by the spaced lands 61 on the pull-off roller 53. The crank 111 is then operated in a clockwise direction as the operator picks up the end of the tape which extends beyond the roller 53 and draws it away from the roller as the roller advances the tape from the roll of tape 46. After a predetermined length of tape has been advanced from the roll of tape 46 due to the operation of crank 111, the reverse movement of the crank interrupts the advancement of the tape and actuates the rack 76 downwardly to move the link 93 downwardly therewith to operate the blade supporting plate 95 and advance the blade 101 across the cutting bar 67 to cut the strip of tape advanced from the roll of tape 46. During this reverse movement, the link 107 has moved the guard or plate 105 outwardly to prevent the engagement of the operator's fingers by the cutting blade during its cutting movement. Upon the reverse movement of the crank 111, the finger 57 again engages the pin 58, thereby advancing the pull-off roll 53 from which the tape is drawn by the operator across the cutting bar 67.

The preponderance of weight provided by the weight element 86 on the link 82 causes the link to assume the position illustrated in Fig. 4. This maintains the teeth 77 of the rack 76 out of engagement with the teeth of the gear 63 and causes the tooth 89 on the pawl 87 to move into a position of engagement therewith. The pawl is free to ride over the teeth in the gear 63 when the gear is operated in a clockwise direction to draw the tape from the roll of tape 46 when viewed from the crank side of the device, which movement would be in a counterclockwise direction, as viewed in Figs. 4 and 7. This eliminates the clicking of the teeth which would normally occur between the lower tooth of the rack 76 and the gear 63 if no means were provided for raising the lower tooth of the rack out of engagement with the teeth of the gear 63. The tooth 89 of the pawl 87 being counterbalanced on the pin 88, the riding of the tooth over the teeth of the gear 63 will prevent any noticeable amount of sound being produced and wear on the lower rack tooth or on the teeth of the gear 63 is avoided.

It will be noted from Fig. 4 that a greater mechanical advantage is provided to the link 82 when the weight 86 on the end thereof is functioning to raise the rack out of engagement with the gear 63, thereby reducing the amount of weight required to a minimum. It will be noted from Fig. 7 that the position of the supporting pin relative to the ends of the link 82 changes as the rack is lowered by the operation of the gear 63 which occurs through the employment of the slot 83. It will be noted from Fig. 1 that recesses 112 are provided in the outer surface of the wall 23 in which the finger of the operator may be disposed for engaging the covers 27 and 28 when these are to be raised. The cover 34 is retained in closed position by a screw 113 which is threaded into the block 33 in which the pintle 26 is journaled.

Referring to Figs. 11 to 15 inclusive, a further form of the invention is illustrated, that wherein mechanism is provided by which the length of tape being delivered may be accurately measured. The mechanism is mounted on the wall 37 of the cover 34 and comprises a pivoted arm 115 mounted on a pintle 116 on a reinforcing plate 117 at the forward end of the device. The arm is formed with a slot 118 and a sector of the gear 119. The teeth of the sector 119 mesh with a gear 121 which is fixed to a large gear 122 and pivoted on a stub shaft 123. A stop element 124 is secured to the end of the shaft 123, which shaft extends through the gears 121 and 122, a spring washer 125 and the wall 37 of the cover 34. An index finger 126 is keyed or otherwise secured to the portion of the shaft 123 extending beyond the wall 37, the assembly being clamped in position by a nut 128. An index scale may be provided on the face of the wall 37 for indicating the position of the finger 126 and the length of tape desired. When the finger is so adjusted, the stop arm 124 is also adjusted to the corresponding position within the cover. The large gear 122 is provided with a stop block 129 which is engageable with a sloping end on the stop element 124 to limit the rotation of the large gear 122 after a predetermined length of tape has been withdrawn.

Figure 14:
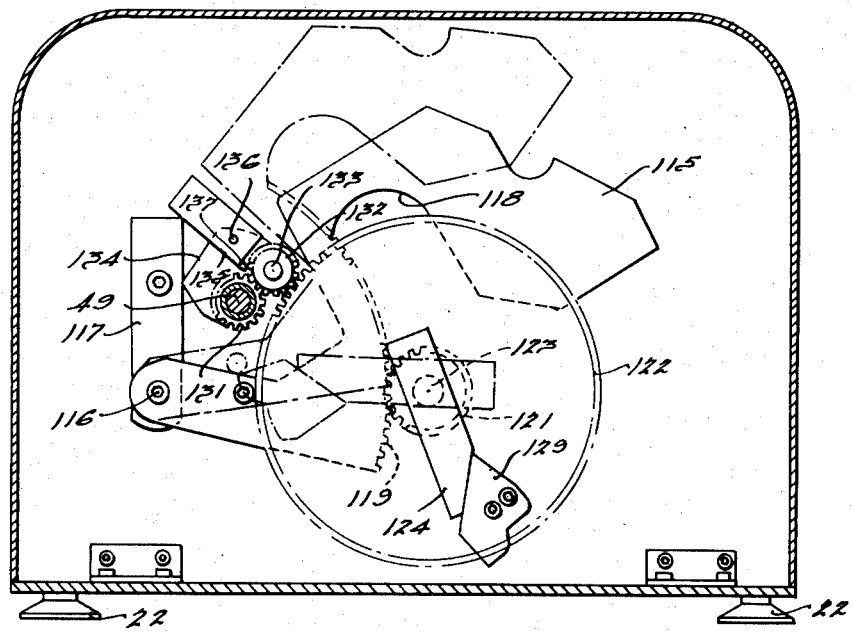
Fig. 14 is a view of the structure illustrated in Fig. 12 when in position to measure a length of tape being metered.
Figure 15:
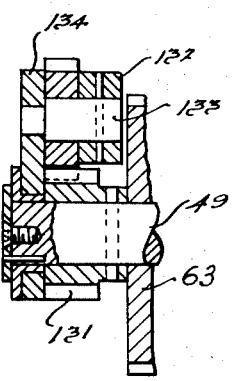
Fig. 15 is an enlarged sectional view of the structure illustrated in Fig. 12, taken on the line 15—15 thereof.

The shaft 49 has a second gear 131 secured thereto beyond the gear 63, disposed in mesh with a gear 132 which is mounted on a pintle 133 and fixed to a plate 134 which is journaled on the shaft 49. A pawl 135 is pivoted on the plate 134 on a pin 136, having a tooth 137 thereon which is movable into a position between the two gears to prevent them from operating when the shaft 49 is turned in a clockwise direction and causing the plate 134 and gear 132 to revolve in a clockwise direction with the gear 131 through at least 90°, which is the movement of the crank 111 in a counterclockwise direction to produce the operation of the cutting blade 101 across the cutting bar or blade 67. This counterclockwise rotation of the plate 134 raises the gear 132 out of mesh with the teeth of the gear 122 which is normally driven thereby when the shaft 49 is rotated clockwise. When the gear 132 is out of mesh with the gear 122, the enlarged or weighted end of the arm 115 causes the arm to move downwardly by gravity about the pivot 116, which causes the gears 121 and 122 to rotate in a counterclockwise direction, as viewed in the figures, to return the stop block 129 to its original position as illustrated in Fig. 12. When the piece of tape is to be delivered by the device, the crank 111 is operated in a clockwise direction, the first 90° movement of which returns the cutting blade 101 to a vertical position and moves the guard or plate 105 to closed position and also rotates the plate 134 in a clockwise direction to engage the teeth of the gear 132 with the teeth of the gear 122. On the continued operation of the crank 111, the tape 62 is fed by the roller 53 from the roll of tape 46 as the operator draws the tape forwardly from the lands 61 across the cutting bar 67. As the rotation of the gear 122 continues, the gear 121, operating in mesh with the teeth of the sector gear 119, causes the arm 115 to be raised. The tape will be continued to be withdrawn from the roll of tape 46 until the stop block 129 strikes the stop element 124, which position is illustrated in Fig. 14. Thereafter, the crank and shaft 49 are moved in a counterclockwise direction through 90° to operate the cutting blade 101 and to lock the gear 132 and raise it from engagement with the teeth of the gear 122. The weight of the arm 115 causes the arm to move downwardly by gravity about the pivot 116 to have the teeth of the sector operate on the gear 121 and return the gear 122 and the stop block 129 to their initial position, that illustrated in Fig. 12. By adjusting the index finger 126 exteriorly of the cover 34, the stop element 124 has its position changed correspondingly and in this manner the device is readily set for accurately measuring pieces of the tape delivered of a desired length which may vary from a very short piece to a long piece within the capacity of the device which is controlled by the size of the gears 131, 132 and 122. By mounting the measuring mechanism upon the cover 34 of the device, the device may be furnished either with or without the measuring mechanism, and by opening the cover the entire roll of tape 46 may be dispensed without interference by the measuring mechanism when this is desired.

What is claimed is:

1. In a tape dispensing device, a base, a pair of spaced walls in said base, a tape dispensing cylinder supported between said walls means on said walls for supporting a roll of tape adjacent to said tape dispensing cylinder, a shaft projecting through said walls on which said cylinder is free to rotate, means fixed to said shaft for driving the cylinder in one direction for dispensing tape while permitting the shaft to be operated in a reverse direction without driving said cylinder, a cutting bar disposed adjacent to said cylinder, a cutting blade pivoted adjacent to said cutting bar, a gear secured on said shaft, a vertically movable rack engageable with said gear, means for disengaging the gear and rack when the cylinder is driven for dispensing tape and for producing the engagement thereafter when the shaft is driven in a reverse direction and a link interconnecting the rack and cutting blade for moving the blade across said bar upon the movement of said shaft in said reverse direction.

2. In a tape dispensing device, a base, a pair of spaced walls in said base, a tape dispensing cylinder supported between said walls means on said walls for supporting a roll of tape adjacent to said tape dispensing cylinder, a shaft projecting through said walls on which said cylinder is free to rotate, means fixed to said shaft for driving the cylinder in one direction but permitting the shaft to be operated in the reverse direction without thereby reversely driving said cylinder, a cutting bar disposed adjacent to said cylinder, a cutting blade pivoted adjacent to said cutting bar to cooperate therewith, a gear fixed on said shaft, a vertically disposed rack engageable with said gear, a link interconnecting the rack and cutting blade, a second link pivoted to the lower end of said rack, a pintle secured to a wall and extending through a slot in said second link, a sufficiently heavy weight on said second link opposite to the end pivoted to said rack to hold the teeth of the rack upwardly out of contact with the gear, and means for engaging the gear and rack upon the reverse operation of said shaft.

3. In a tape dispensing device, a base, a pair of spaced walls in said base, a tape dispensing cylinder supported between said walls means on said walls for supporting a roll of tape adjacent to said tape dispensing cylinder, a shaft projecting through said walls on which said cylinder is free to rotate, means fixed to said shaft for driving the cylinder in one direction but permitting the shaft to be operated in the reverse direction without thereby reversely driving said cylinder, a cutting bar disposed adjacent to said cylinder, a cutting blade pivoted adjacent to said cutting bar to cooperate therewith, a gear fixed on said shaft, a vertically disposed rack engageable with said gear, a link interconnecting the rack and cutting blade, a second link pivoted to the lower end of said rack, a pintle secured to a wall and extending through a slot in said second link, a sufficiently heavy weight on said second link opposite to the end pivoted to said rack to hold the teeth of the rack upwardly out of contact with said gear, and a pawl on said rack having a tooth engageable with the teeth of said gear for moving said rack downwardly into mesh with the teeth of the gear when the shaft is reversed to operate the gear in a reverse direction to produce the severing of a length of tape.

4. In a tape dispensing device, a base, a pair of spaced walls in said base, a tape dispensing cylinder supported between said walls, means on said walls for supporting a roll of tape adjacent to said tape dispensing cylinder, a shaft projecting through said walls on which said cylinder is free to rotate, means fixed to said shaft for driving the cylinder in one direction but permitting the shaft to be operated in the reverse direction without thereby reversely driving said cylinder, a cutting bar disposed adjacent to said cylinder, a cutting blade pivoted adjacent to said cutting bar to cooperate therewith, a gear fixed on said shaft, a vertically disposed rack engageable with said gear, a link interconnecting the rack and cutting blade, a second link pivoted to the lower end of said rack, a pintle secured to a wall and extending through a slot in said second link, a sufficiently heavy weight on said second link opposite to the end pivoted to said rack to hold the teeth of the rack upwardly out of contact with said gear, a pawl on said rack having a tooth engageable with the teeth of said gear for moving said rack downwardly into mesh with the teeth of the gear when the shaft is reversed, a second gear secured on the end of the shaft, a plate revolvable on said shaft, a pintle extending from said plate, a gear carried by said pintle in mesh with said last gear on said shaft, and a pawl pivoted on said pintle having a tooth engageable with said gear mounted on the pintle for preventing its rotation and producing the revolution of the plate, gear, pintle and pawl when the shaft is operating in a reverse direction.

5. In a tape dispensing device, a base, a pair of spaced walls in said base, a tape dispensing cylinder supported between said walls means on said walls for supporting a roll of tape adjacent to said tape dispensing cylinder, a shaft projecting through said walls on which said cylinder is free to rotate, means fixed to said shaft for driving the cylinder in one direction but permitting the shaft to be operated in the reverse direction without thereby reversely driving said cylinder, a cutting bar disposed adjacent to said cylinder, a cutting blade pivoted adjacent to said cutting bar to cooperate therewith, a gear fixed on said shaft, a vertically disposed rack engageable with said gear, a link interconnecting the rack and cutting blade, a second link pivoted to the lower end of said rack, a pintle secured to a wall and extending through a slot in said second link, a sufficiently heavy weight on said second link opposite to the end pivoted to said rack to hold the teeth of the rack upwardly out of contact with said gear, a pawl on said rack having a tooth engageable with the teeth of said gear for moving said rack downwardly into mesh with the teeth of the gear when the shaft is reversed, a second gear secured on the end of the shaft, a plate revolvable on said shaft, a pintle extending from said plate, a gear carried by said pintle in mesh with said last gear on said shaft, a pawl pivoted on said pintle having a tooth engageable with said gear mounted on the pintle for preventing its rotation and producing the revolution of the plate, gear, pintle and pawl when the shaft is operating in a reverse direction, a cover pivoted on said base, and a measuring device pivoted on said cover operated by a gear with which the gear on the pintle meshes for limiting the operation of the shaft and cylinder for dispensing tape from the device.

6. In a tape dispensing device, a base, a pair of spaced walls in said base, a tape dispensing cylinder supported between said walls means on said walls for supporting a roll of tape adjacent to said tape dispensing cylinder, a shaft projecting through said walls on which said cylinder is free to rotate, means fixed to said shaft for driving the cylinder in one direction but permitting the shaft to be operated in the reverse direction without thereby reversely driving said cylinder, a cutting bar disposed adjacent to said cylinder, a cutting blade pivoted adjacent to said cutting bar to cooperate therewith, a gear fixed on said shaft, a vertically disposed rack engageable with said gear, a link interconnecting the rack and cutting blade, a second link pivoted to the lower end of said rack, a pintle secured to a wall and extending through a slot in said second link, a sufficiently heavy weight on said second link opposite to the end pivoted to said rack to hold the teeth of the rack upwardly out of contact with said gear, a pawl on said rack having a tooth engageable with the teeth of said gear for moving said rack downwardly into mesh with the teeth of the gear when the shaft is reversed, a second gear secured on the end of the shaft, a plate revolvable on said shaft, a pintle extending from said plate, a gear carried by said pintle in mesh with said last gear on said shaft, a pawl pivoted on said pintle having a tooth engageable with said gear mounted on the pintle for preventing its rotation and producing the revolution of the plate, gear, pintle and pawl when the shaft is operating in a reverse direction, a cover pivoted on said base, a measuring device pivoted on said cover operated by a gear with which the gear on the pintle meshes for limiting the operation of the shaft and cylinder for dispensing tape from the device, and means for adjusting said measuring mechanism for regulating the lengths of the tape dispensed.

7. In a dispensing and severing device, means for dispensing a length of tape driven by a shaft, a cutting-off device for severing the tape comprising relatively movable blades, a gear on said shaft, a vertically disposed rack having teeth capable of meshing with said gear, a link interconnecting the rack and the severing mechanism for producing the relative operation of the cutting elements to and from cutting position, a link pivoted to the lower end of said rack, a pivot extending through a longitudinal slot in the link upon which the link pivots, a weight on the end of the link opposite to that which is pivoted to the rack sufficient to raise said rack to a position out of mesh with said gear, and a pawl on said rack having a tooth thereon engageable with the teeth of the gear for causing the rack to move downwardly into mesh with the gear when the gear is driven in a predetermined direction thereby raising the weight and opening the cutter mechanism.

GEORGE H. BOYD.

References Cited in the file of this patent

UNITED STATES PATENTS

| Number | Name | Date |
|---|---|---|
| 868,977 | Elliott | Oct. 22, 1907 |
| 1,442,058 | Emmert | Jan. 16, 1923 |
| 1,484,598 | Weniger | Feb. 19, 1924 |
| 1,487,068 | Kuhn | Mar. 18, 1924 |
| 1,663,092 | Parys | Mar. 20, 1928 |
| 1,749,296 | Moyer | Mar. 4, 1930 |
| 1,938,445 | Odell | Dec. 5, 1933 |
| 1,972,851 | McCarthy | Sept. 4, 1934 |
| 2,009,702 | Mortimer | July 30, 1935 |
| 2,175,959 | Goldstein | Oct. 10, 1939 |
| 2,260,489 | Sim | Oct. 28, 1941 |
| 2,285,507 | Gilliam | June 9, 1942 |
| 2,291,668 | Weigolt | Aug. 4, 1942 |
| 2,341,956 | Staude | Feb. 15, 1944 |
| 2,384,575 | Stull | Sept. 11, 1945 |
| 2,507,446 | Krueger | May 9, 1950 |